C. H. POWERS.
Chucks.

No. 164,658.　　　　　　　　　　　　Patented June 22, 1875.

Witnesses:
Benj. F. Quinsby
E. N. Ballowclough

Inventor:
Chas. H. Powers

THE GRAPHIC CO. PHOTO-LITH. 39 & 41 PARK PLACE, N.Y.

UNITED STATES PATENT OFFICE.

CHARLES H. POWERS, OF PHILADELPHIA, PENNSYLVANIA.

IMPROVEMENT IN CHUCKS.

Specification forming part of Letters Patent No. 164,658, dated June 22, 1875; application filed January 4, 1875.

*To all whom it may concern:*

Be it known that I, CHARLES H. POWERS, of Philadelphia, Pennsylvania, have invented an Improvement in Chucks, of which the following is a specification:

The chuck herein described adapts itself to drill-shanks, pins, or other inserted objects, straight or tapered.

The nature of the invention will appear from the following detailed description.

Figure 1:
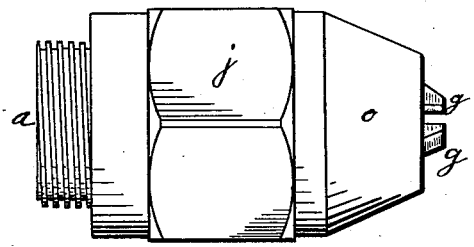
Figure 2:
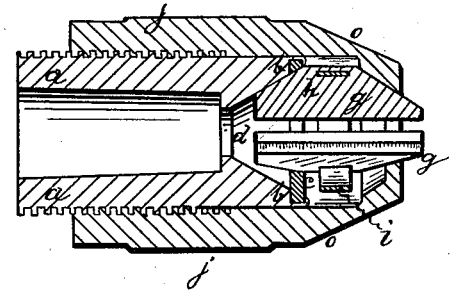
Figure 3:
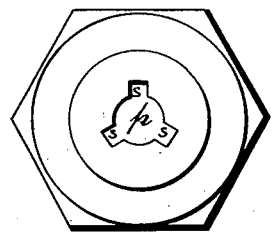
Figure 4:
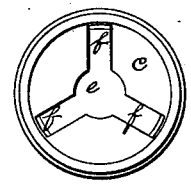
Figure 5:
Figure 6:
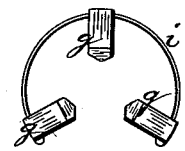

In the annexed drawings, Figure 1 is a side view, Fig. 2 a longitudinal section, and Fig. 3 a front end view, of the chuck. Fig. 4 is a front end or face view of the back-guide for the jaws; Fig. 5, a side view of one of the three similar jaws employed; and Fig. 6 an end view of the jaws as arranged on a coiled spring.

$a$ is the screw-plunger, which is of ordinary construction, except that there is formed in its front end a recess, $b$, to form a seat for the back-guide $c$, Figs. 2 and 4, and a conical recess, $d$, Fig. 2, corresponding to the rear inclinations of the jaws. The back-guide $c$ is a plate in which there is formed a central aperture, $e$, Fig. 4, corresponding to the size of the drill-shank or pin, or other inserted object the chuck is intended for. From the aperture $e$ there extend radial slots $f$, to receive the rear ends of the respective jaws. The guide $c$ is susceptible of a rotary motion in its seat. $g$, Figs. 1, 2, 5, and 6, represent the jaws, which are constructed with double tapers or inclinations, as shown in Fig. 5. Each of the jaws is provided with a slot, $h$, Fig. 5, to receive the spring $i$, Figs. 2 and 6, the slots being made a little larger than the spring in section to admit of the necessary vibration of the spring and jaws, when the jaws are adjusting themselves to different drill-shanks, pins, or other inserted objects. $j$ is a nut, formed with a side chamber, $o$, to inclose the said jaws and spring, the face or front end of said chamber being provided with a central aperture, $p$, and with radial slots $s$, tapered or inclined to suit the taper of the front ends of the jaws, as shown in Figs. 2 and 3.

As the nut $j$ is screwed onto the screw-plunger $a$, the conical recess $d$ in the plunger and the tapered radial slots $s$ in the face of the nut acting on the tapered edges of the jaws $g$, compress the spring carrying the jaws and cause the jaws to close down upon and firmly gripe any drill-shank, pin, or other inserted object, whether the sides of the same are straight or tapered.

I claim—

The plunger $a$, provided with a seat, $b$, and a conical recess, $d$, the back-guide $c$, the jaws $g$, spring $i$, and the nut or sleeve $j$, provided with radial slots $s$, in combination, as and for the purpose set forth.

CHAS. H. POWERS.

Witnesses:
BENJ. F. QUIMBY,
E. BARRACLAUGH.